United States Patent [19]

Meyer et al.

[11] Patent Number: 4,658,848
[45] Date of Patent: Apr. 21, 1987

[54] HEAT RESPONSIVE BACKSEAT FOR GATE VALVES

[75] Inventors: Danny S. Meyer, Richmond; William S. Shelton, Houston, both of Tex.

[73] Assignee: Joy Manufacturing Company, Pittsburgh, Pa.

[21] Appl. No.: 565,431

[22] Filed: Dec. 27, 1983

[51] Int. Cl.⁴ .......................... F16K 41/16; F16K 3/00
[52] U.S. Cl. ...................... 137/72; 251/327; 251/330
[58] Field of Search ............... 251/330, 214, 327; 137/72, 75

[56] References Cited

U.S. PATENT DOCUMENTS

| | | | |
|---|---|---|---|
| 4,245,661 | 1/1981 | McGee | 137/72 |
| 4,289,157 | 9/1981 | McGee | 137/72 |
| 4,307,745 | 12/1981 | McGee | 251/214 X |
| 4,510,960 | 4/1985 | Jennings et al. | |
| 4,568,062 | 2/1986 | Regitz et al. | 251/328 |

*Primary Examiner*—Arnold Rosenthal
*Attorney, Agent, or Firm*—David A. Warmbold

[57] ABSTRACT

An improved heat responsive backseat for gate valves which includes a rotating valve stem (50) carried by a bonnet assembly (14) for actuation of a gate member (40). A fusible stem ring (126) supports the valve stem at an outer portion thereof (68) within a roller bearing chamber (56) of the bonnet assembly. The valve stem (50) moves axially outward from the valve chamber (20) when the fusible stem ring (126) melts due to an external fire condition to bring a valve stem backseat portion (64) into sealing engagement with a bonnet seat portion (54). The valve stem (50) moves axially outward from the valve chamber (20) independently of roller bearings (74, 76) contained within roller bearing chamber (56) such that the roller bearings (74, 76) remain axially fixed with respect to the bonnet assembly before, during and after the shifting of the valve stem. Therefore, the valve stem may be easily rotated after the fire condition has been extinguished without the occurrence of cocking or wedging between the bearing means and valve stem. Accordingly, a secondary metal-to-metal seal is provided between the valve stem (50) and bonnet assembly (14) such that if the primary packing (104) is destroyed by the fire condition the gate valve will not leak flowline fluid exteriorly of the gate valve.

20 Claims, 6 Drawing Figures

HEAT RESPONSIVE BACKSEAT FOR GATE VALVES

BACKGROUND OF THE INVENTION

This invention relates generally to fire-safe, non-rising stem type gate valves and, more specifically, to such a fire-safe gate valve having a fusible body or bodies which upon melting permit the stem to rise relative to the bonnet to provide a metal-to-metal backseat therebetween.

Gate valves, both slab type and expanding type, are used in the pipeline industry to control fluid flow in oil and gas pipelines. Such valves are provided with packing assemblies which work well in maintaining the integrity of the valve under ordinary circumstances, but which are subject to being damaged should there be a fire, the heat of which engulfs the valve for more than a short period of time. Accordingly, gate valves have been constructed which provide a metal-to-metal backseat seal between the stem and valve bonnet which are normally kept in a spaced relationship to one another by using one or more fusible bodies. If a fire occurs subjecting the valve to sufficient heat to melt the fusible materials, the valve components are permitted to shift allowing the metal-to-metal backseat to complete a seal. Examples of gate valves utilizing fusible materials to provide a backseat are shown in the following table of U.S. patents:

| Patentee | U.S. Pat. No. | Issue Date |
| --- | --- | --- |
| Wicke | 3,771,540 | Nov. 13, 1973 |
| Allen | 3,788,600 | Jan. 29, 1974 |
| Wicke | 3,842,854 | Oct. 22, 1974 |
| Wicke | 3,896,835 | Jul. 29, 1975 |
| Williams, Jr. et al | 4,214,600 | Jul. 29, 1980 |
| McGee | 4,245,661 | Jan. 20, 1981 |
| McGee | 4,289,157 | Sep. 15, 1981 |

However, in most of the above U.S. patents the fusible materials are positioned above the stem bearings relative to the flow passage of the valve. In this position when the fusible material melts the bearings and valve stem will be forced upwardly or outwardly from the flow passage by the pressurized fluid existing therein. Thus, the stem is allowed to backseat against the valve bonnet to provide sealing protection for the packing assembly and upper bonnet areas of the valve. However, since the bearings are allowed to move with the stem there exists the possibility that the bearings will become cocked or wedged against the stem, thereby making it difficult or impossible to cycle the valve after the fire has extinguished.

Furthermore, in the prior art patents listed above, the valve stem and gate member are connected so that when the fusible material melts and vacates its cavity the gate member will shift with the valve stem to provide the backseat seal with the valve bonnet. However, pressurized fluid in the upstream flowline continually acts on the gate member when it is in the closed position to create a drag force on the face thereof which impedes any upwardly or outwardly movement of the gate member. Accordingly, the valve stem can be prevented from backseat sealing with the bonnet assembly due to its connection with the gate member and, thus, the packing assembly will be subjected to the highly pressurized fluid existing within the valve during a fire condition. Additionally, the packing assembly may deteriorate due to the extreme heat caused thereby and flowline fluid will then leak exteriorly of the valve to further fuel the fire condition occurring exteriorly of the valve. Therefore, it is of beneficial value to have a gate valve with a heat responsive backseat which allows the valve stem to backseat with the bonnet assembly independently of the gate member.

SUMMARY OF THE INVENTION

It is therefore a primary object of this invention to provide an improved heat responsive backseat for gate valves which overcomes the aforementioned disadvantages of the prior art devices.

Another object of the invention is to provide an improved heat responsive backseat for gate valves responsive to the excessive heat of a fire to provide a metal-to-metal valve stem seal before the stem packing assembly starts to leak because of such excessive heat.

Another object of the invention is to provide a heat responsive backseat for gate valves which allows the valve stem to rise independently of the roller bearings so that there exists no possibility of the roller bearings becoming cocked or wedged against the valve stem upon melting of the fusible material and actuation of the heat responsive backseat of the present invention.

A further object of the invention is to provide an improved heat responsive backseat for gate valves which allows the valve stem to rise independently of the gate member so that possible gate drag will not effect the actuation of the metal-to-metal backseat seal of the present invention.

The invention is an improved heat responsive backseat for gate valves which includes a rotating valve stem carried by a bonnet assembly for actuation of a gate member with a fusible stem ring supporting the valve stem at an outer portion thereof within a thrust bearing chamber of the bonnet assembly. The valve stem moves axially outward from the valve chamber when the fusible stem ring melts due to an external fire condition to bring a stem backseat portion into sealing engagement with a bonnet seat portion thereby preventing valve stem leakage even though the packing assembly surrounding the valve stem is destroyed by the extreme heat of the fire condition. The valve stem moves axially outward from the valve chamber independently of the roller bearing means so that there exists no possibility of the roller bearings becoming cocked or wedged against the valve stem which could prevent further rotation of the valve stem after the fire condition ceases to exist.

Another feature of the present invention includes a fusible gate ring positioned within a stem connection means. The stem connection means provides a connection between the valve stem and gate member such that rotational movement of the valve stem is transmitted into axial movement of the gate member to open and close the gate valve. The fusible gate ring is positioned therein supporting the gate member so that when the fusible stem and gate rings melt due to an external fire condition the valve stem moves axially outward from the valve chamber independently of the gate member so that there exists no possibility of gate drag caused by fluid pressure in the fluid passages acting on the gate members and preventing the valve stem from backseat sealing with the bonnet assembly. Furthermore, the heat responsive backseat of the present invention can be activated with the gate member in either the open, closed or partially closed positions.

BRIEF DESCRIPTION OF THE DRAWINGS

In the accompanying drawings which form part of the specification and are to be read in conjunction therewith.

DETAILED DESCRIPTION OF A PREFERRED EMBODIMENT

Figure 1:
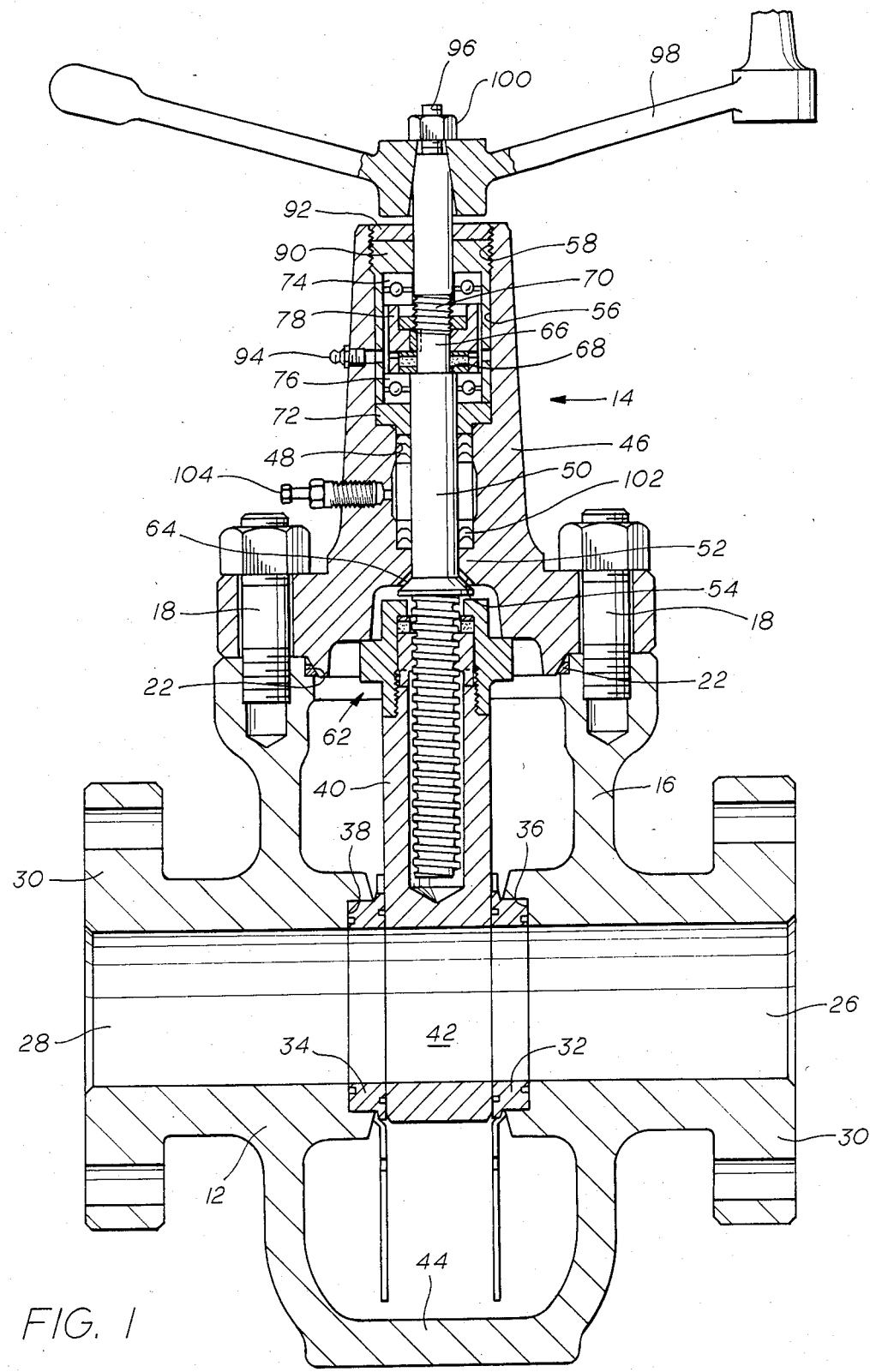
FIG. 1 is a side elevational view, a portion in section, of a normally non-rising stem type slab gate valve utilizing the heat responsive backseat of the present invention, the slab gate valve is illustrated in the open position with both the fusible stem ring and fusible gate ring positioned therein.

Referring to the drawings and specifically FIG. 1, a normally non-rising stem type slab gate valve for use in pipelines or related installations utilizing the heat responsive backseat of the present invention is illustrated and indicated generally at 10. The valve structure 10 includes a valve body 12 and bonnet assembly 14 which is attached to an upper flange portion 16 (in the orientation shown in the drawing) of valve body 12 by a plurality of bolts 18. A sealing member 22 is positioned in an annular groove 24 defined between valve body 12 and bonnet assembly 14 and seals therebetween. Valve body 12 has inlet and outlet fluid passages 26 and 28, respectively, which are in fluid communication with valve chamber 20. Valve body 12 is provided with connection flanges 30 at the outer ends of passages 26 and 28 relative to valve chamber 20 for connecting gate valve 10 into a fluid carrying pipeline or similar installation.

A pair of annular seat members 32 and 34 are retained in generally parallel annular seat recesses 36 and 38, respectively, which are disposed about flow passages 26 and 28, respectively, adjacent valve chamber 20. A gate member 40 is disposed between seat members 32 and 34 for reciprocal movement within valve chamber 20. Gate member 40 is movable from a position in which a port 42 through gate 40 is in registry with fluid passages 26 and 28 to a position blocking fluid flow through said fluid passages. Valve body 12 has a gate stop 44 against which the bottom of gate member 40 rests when the valve is closed to prevent further downward movement of the gate member 40.

The bonnet assembly 14 has an upwardly extending projection 46 in which is formed a longitudinal passage 48 for receiving a non-rising valve stem 50. The lower end of passage 48 communicates with valve chamber 20 and has a central projection 52 extending therein adjacent the passage opening to the valve chamber to provide a frusto-conical seat portion 54 facing the valve chamber. The upper end of passage 48 opens into an enlarged bearing chamber 56 which is internally threaded at its upper end 58. The valve stem 50 is normally longitudinally fixed within passage 48 with its lower end section extending into valve chamber 20. The lower valve stem end section includes an externally threaded portion 60 to provide a connection with gate member 40 via a stem connection means 62, and an upwardly facing frusto-conical backseat portion 64 which is adjacent the threaded end section 60. This stem backseat portion 64 is normally held in a position spaced from bonnet assembly seat portion 54. The valve stem 50 further includes a reduced diameter portion 66 defining an upwardly facing stem shoulder 68, and an externally threaded portion 70 located adjacent and above the reduced diameter portion 66. The reduced diameter portion 66 and threaded portion 70 are longitudinally positioned within the enlarged bearing chamber 56 with a support plate 72 being located at the bottom of chamber 56 surrounding the valve stem 50. Upper and lower roller bearings 74 and 76, respectively, are positioned within the bearing chamber surrounding the valve stem 50 with the lower roller bearing 76 resting on support plate 72. The roller bearings 74 and 76 are separated by an annular spacer 78 which as an inwardly extending flange 80 intermediate its end defining upper and lower support shoulders 82 and 84, respectively. The upper support shoulder 82 supports a lock nut 86 which is threaded on the externally threaded portion 70 of the valve stem. A key 88 rotationally locks the valve stem 50 to spacer flange 80. A packing retainer 90 and cover plate 92 are threadably received in the upper end of the bearing chamber 56, the packing retainer being installed first and, after its adjustment, the cover plate being installed. Lubrication of roller bearings 74 and 76 may be of permanent or sealed type or lubrication may be effected by introducing lubricant through a fitting 94. The upper end section of valve stem 50 extending above the bonnet assembly 14 is tapered and terminates in the reduced diameter threaded section 96. A handwheel 98 fits over the tapered portion of stem 50 and is secured thereto by nut 100.

Stem passage 48 further defines a annular packing chamber within bonnet assembly 14 and a packing assembly 102 is disposed within this chamber to form a fluid-tight seal between the valve stem 50 and bonnet assembly 14. Packing assembly 102 may include any of a number of commercially available packing materials which may be introduced into the packing chamber via a packing fitting 104 extending radially from the packing chamber to the outside of the bonnet assembly 14.

The stem connection means 62 provides a structure to connect the lower end of the valve stem 50 to an upwardly extending integral extension 106 of gate member 40. The gate member extension 106 is externally threaded as indicated at 108 and has a longitudinal bore 110 in which the threaded valve stem end section 60 is received. The gate member extension further includes a pair of aligned slots 112 formed in its upper end. The stem connection structure further includes a stem nut 114 which is threadably received on the valve stem end section 60. The stem nut 114 includes a pair of ears 116 which depend downwardly from the stem nut 114 and are received in the corresponding gate member slots 112. The engagement between ears 116 and the sides of slots 112 prevents stem nut 114 from rotating relative to gate member 40 so that the rotary movement of valve stem 50 is translated to vertical movement of gate member 40. A gate nut 118 of cylindrical cup shape is threadably received onto the gate member extension 106 surrounding valve stem 50 and enclosing the stem nut 114. The top portion of the gate nut 118 has an opening 120 of larger diameter than the diameter of valve stem 50, but smaller in diameter than the diameter of stem nut 114. This particular size relationship between the gate nut opening 120, the valve stem 50 and the stem nut 114 allows gate nut 118 to loosely fit about valve stem 50 when gate nut 118 is attached to gate member extension 106 while simultaneously holding stem nut 114 in position on the stem. Gate nut 118 further includes an outwardly extending shoulder stop 122 which contacts bonnet assembly 14 to limit the upward movement of the gate member 14.

Figure 2:
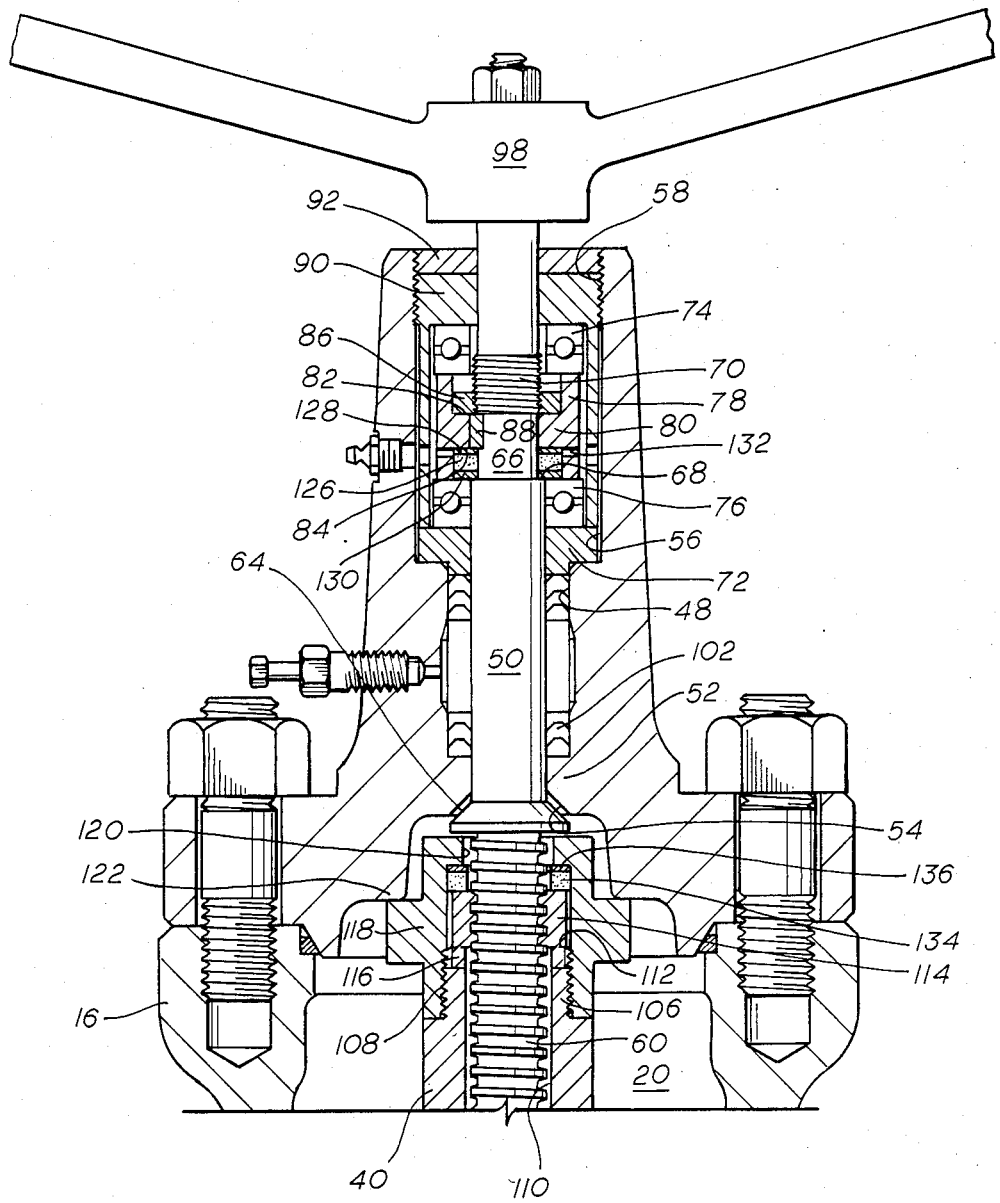
FIG. 2 is a partial sectional view of the slab gate valve of FIG. 1, the heat responsive backseat of the present invention shown in its spaced relationship to the bonnet assembly with both the fusible stem and gate rings positioned therein.
Figure 3:
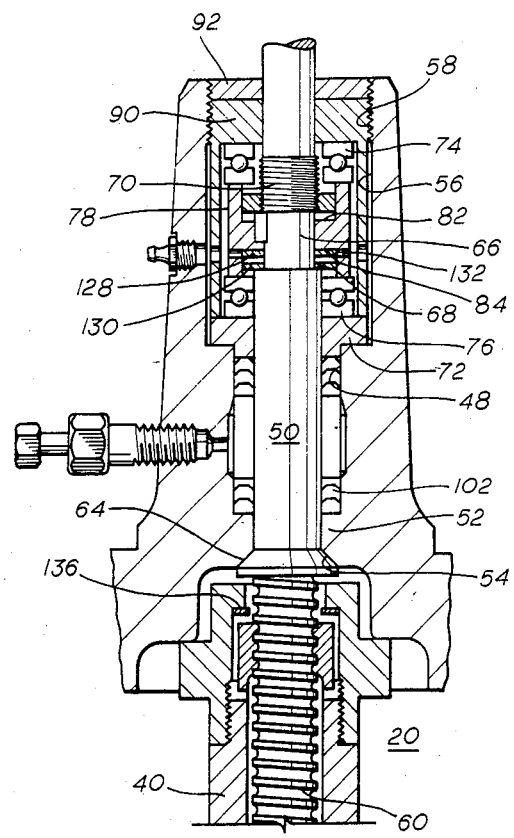
FIG. 3 is a partial sectional view of the slab gate valve of FIG. 1, the heat responsive backseat of the present invention is shown in its closed or sealed position after both the fusible stem and gate rings have vacated their respective positions within the gate valve.
Figure 4:
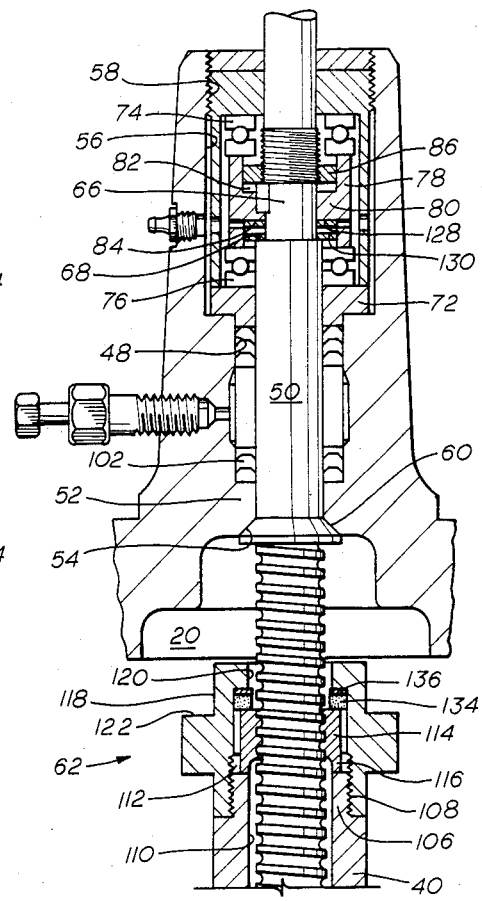
FIG. 4 is a partial sectional view of the slab gate valve of FIG. 1, the slab gate valve is illustrated in the open or down position, the heat responsive backseat of the present invention is shown in its closed or sealed position with only the fusible stem ring shown vacated from its position within the gate valve.

Referring particularly to FIGS. 2-4, the heat responsive backseat of the present invention is shown in greater detail. As is illustrated, the gate valve 10 is normally a non-rising stem gate valve wherein the main seal between the valve chamber 20 and the external environment where the valve stem 50 penetrates the bonnet assembly is conventionally provided by the packing assembly 102 as discussed above. However, should there be a fire in the vicinity of the gate valve 10 there exists the possibility that the packing assembly 102 may be destroyed. Therefore, it is desirable to provide a gate valve with a secondary sealing system which will allow the normally non-rising valve stem to rise sufficiently to provide a metal-to-metal backseat seal beteen the valve stem and the bonnet assembly when the gate valve is subjected to the extreme of heat of a fire condition.

As shown in FIG. 2, such a heat responsive backseat is provided in gate valve 10 between the valve stem backseat portion 64 and the bonnet seat portion 54. The valve stem 50 is normally supported in place by use of a fusible material 126 which is fashioned in the shape of a ring and is positioned within the annular space between the lower support shoulder 84 of annular spacer 78 and the upwardly facing valve stem shoulder 68 surrounding the reduced diameter portion 66 of valve stem 50. A pair of washers 128 and 130 are positioned above and below the fusible ring 126 to provide solid seating surfaces for shoulders 68 and 84. The longitudinal position of the valve stem 50 relative to the bonnet assembly 14 is fixed by threading lock nut 86 tightly onto the valve stem externally threaded portion 70 which in turn raises the valve stem 50 until the fusible ring 126 contacts or is squeezed between the stem shoulder 68 and the lower support spacer shoulder 78. Such fusible material is preferably a eutectic material having a melting point sufficiently above normal ambient temperatures to provide adequate support for the valve stem shoulder 68 under all normal conditions and yet, melt promptly when the gate valve is exposed to a fire condition. When the fusible ring 126 melts it is drained and/or otherwise expelled from its position supporting valve stem 50 to the exterior of annular spacer 78 through drain holes 132 to assure that the fusible material does not become trapped and continue to maintain its support of stem shoulder 68 and valve stem 50. This assures that valve stem 50 is free to move axially to provide the metal-to-metal backseat seal between the stem backseat portion 64 and the bonnet seat portion 54. The pressure within the valve chamber 20 acts on the stem to urge it upwardly or outwardly until such a backseat seal is obtained.

Referring to FIG. 4, a portion of the gate valve is shown with the valve stem 50 in the outward or back seated position. The fusible ring 126 has melted and exited by drain holes 132 and the valve stem 50 has been forced outwardly by fluid pressure within valve chamber 20 to provide the backseat as discussed above. This prevents leakage of fluids flowing through fluid passages 26 and 28 to escape around valve stem 50 when packing assembly 102 is destroyed or damaged by excessive heat. As shown in FIG. 2, the roller bearings 74 and 76 and annular spacer 78 do not move axially with respect to the valve stem 50 upon melting of the fusible ring 126. This is an important feature of the present invention since in a majority of the prior art patents the fusible material is positioned above the roller bearing means such that upon melting the roller bearings are allowed to move axially with the valve stem to provide a backseat. Roller bearing movement can cause difficulties in cycling the valve after the fire condition has ceased to exist as the roller bearings may become cocked or wedged within the bearing chamber thus preventing easy rotation of the valve stem to open or close the valve. In the present invention, the particular placement of the fusible ring 126 allows the valve stem 50 to move axially upwrd with respect to roller bearings 74 and 76 which remain stationary to provide a valve stem that may still be easily rotated after the fire condition has ceased to exist.

The gate valve illustrated in FIGS. 1-4, includes the shoulder stop 122 extending radially from gate nut 118 to limit the upward movement of gate member 40. When the gate member is in its upwardly maximum position with stop 122 contacting bonnet assembly 14, as shown in FIGS. 2-3, the valve stem 50 and backseat portion 64 cannot rise sufficiently to provide a metal-to-metal seal with the bonnet seat portion 54. Accordingly, a second fusible gate ring 134 has been provided within gate nut 118 so that upon melting of ring 134 the valve stem 50 will move axially upward independent of the gate nut 118 and gate member 40. The fusible gate ring 134 is positioned between the upper surface of stem nut 114 and the lower inside surface of gate nut 118 surrounding the lower valve stem portion 60. The ring 134 has a larger diameter than the diameter of opening 120 in gate nut 118 such that the ring 134 supports gate nut 118 and gate member 40 on stem nut 114. It may be necessary to provide a bearing washer 136 between ring 134 and gate nut 118 to better transmit the load of gate member 40 across the entire surface of fusible gate ring 134. Referring to FIG. 3, upon the occurrence of a fire condition which radiates extreme heat the fusible stem and gate rings 126 and 134, respectively, will melt vacating their respective positions supporting the valve stem 50. Thus, valve stem 50 will move axially upward under fluid pressure from within the valve chamber to provide the metal-to-metal backseat between valve stem backseat portion 64 and bonnet seat portion 54 independently of the roller bearings 74 and 76 and the gate member 40.

Furthermore, the use of the fusible gate ring 134 within the stem connection means 62 provides benefits to the gate valve even when the gate member is not in its maximum upward position. As shown in FIG. 4, when the gate member 40 is in the closed or downward position, the heat responsive backseat of the present invention may be provided without the use of fusible gate ring 134 because gate nut stop 122 will not contact the bonnet assembly 14 upon the melting of fusible stem ring 126. However, when the gate member 40 is in the closed position the pressurized fluid in the upstream inlet fluid passage 26 creates a drag force which acts on the face of gate member 40 to impede the normal movement of the gate member from its closed to open positions. In a fire situation, the internal pressures within the gate valve increase dramatically to create even larger drag forces acting on the gate member. Therefore, upon the melting of the fusible stem and gate rings 126 and 134, respectively, the valve stem 50 will backseat with bonnet assembly 14 completely independent of the gate member 40 so that gate drag will not affect actuation of the heat response backseat of the present invention.

Figures 5, 6:
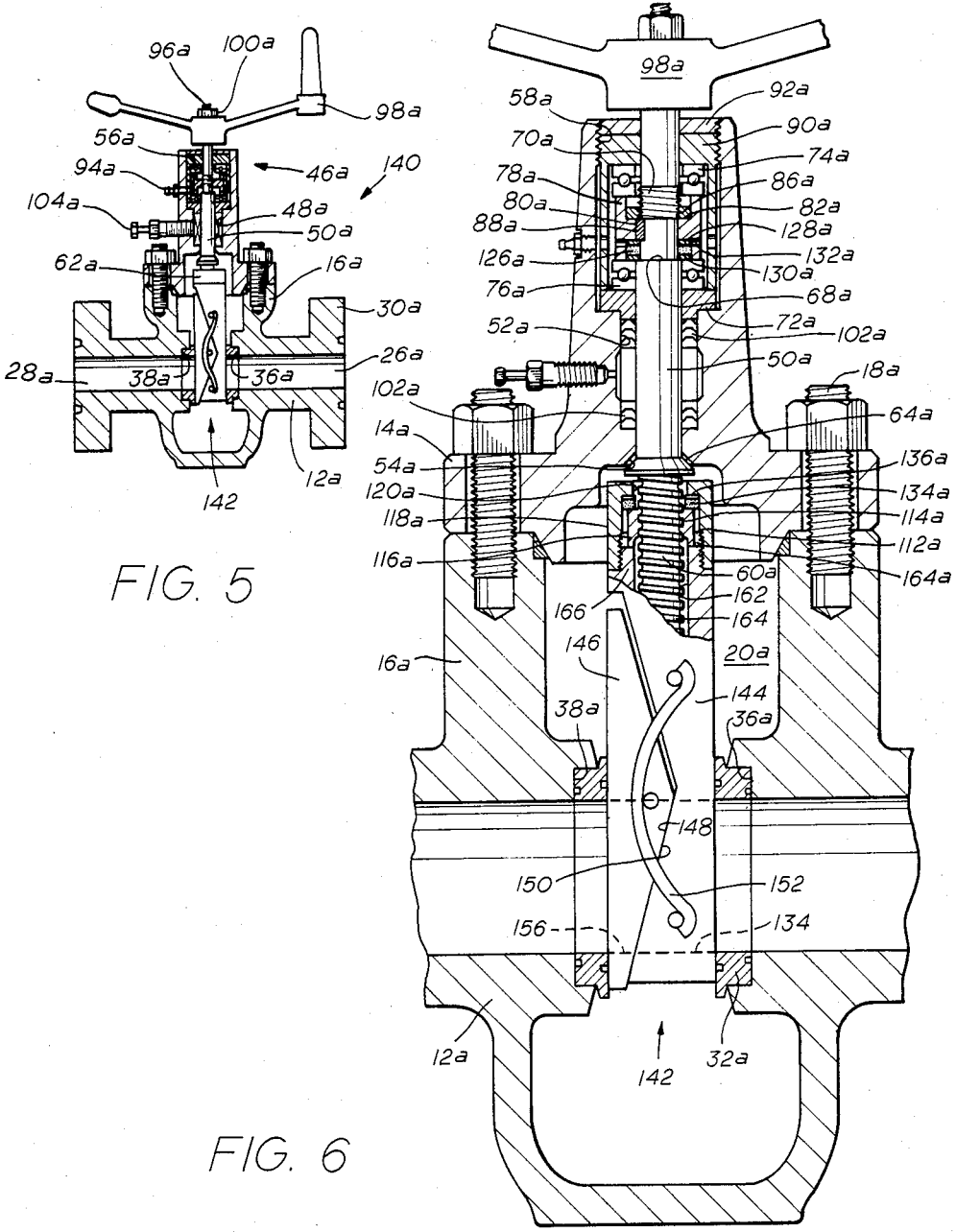
FIG. 5 is a side elevational view, a portion in section, of a non-rising stem type expanding gate valve utilizing the heat responsive backseat of the present invention, the expanding gate valve is shown in the open position with both the fusible stem ring and fusible gate ring positioned therein.
FIG. 6 is a partial sectional view of the expanding gate valve of FIG. 5, the heat responsive backseat of the present invention shown in its spaced relationship to the bonnet assembly with both fusible stem and gate rings positioned therein.

The heat responsive backseat of the present invention is also applicable to a gate valve having an expanding type gate member as illustrated in FIGS. 5 and 6 are indicated at 140. Since the two types of gate valves are very similar in construction, the reference numerals used for like parts in the expanding gate valve will not change from those of the slab gate valve except that an "A" will be placed thereafter. Valve 140 is comprised of a valve body 12A and a bonnet assembly 14A which is attached to an upper flange portion 16A of valve body 12A by a plurality of bolts 18A. Bonnet assembly 14A forms a closure for an open ended valve chamber 20A defined by the annular flanged portion 16A. A sealing member 22A is positioned in annular groove 24A defined between valve body 12A and bonnet assembly 14A and seals therebetween. Valve body 12A has inlet and outlet fluid passages 26A and 28A, respectively, which are in fluid communication with valve chamber 20A. Valve body 12A is provided with connection flanges 30A at the outer ends of passages 26A and 28A relative to valve chamber 20A for connecting gate valve 140 into a fluid carrying pipeline or similar installation.

A pair of annular seat members 32A and 34A are retained in generally parallel annular seat recesses 36A and 38A, respectively, which are disposed about flow passages 26A and 28A, respectively, adjacent valve chamber 20A. An expanding gate assembly 142 is disposed between seat members 32A and 34A for reciprocal movement within valve chamber 20A. Expanding gate assmbly 142 includes a gate element 144 and a complementary segment 146. Gate element 144 has a V-shaped recess 148 and segment 146 has a V-shaped face 150. The V-shaped recess and face complement each other so that V-shaped face 150 fits within recess 148 when gate element 144 and segment 146 are in a fully collapsed position. A pair of springs 152, one on each side of gate assembly 142, extend between the sides of gate element 144 and segment 146 for continuously urging them into their fully collapsed position.

When the gave valve 140 is in a closed position (not shown), ports 154 and 156 are not aligned with flow passages 26A and 28A, and the gate assembly is interposed between the flow passages to block flow of fluid through the gate valve.

The bonnet assembly 14A has an upwardly extending projection 46A in which is formed a longitudinal passage 48A for receiving a non-rising valve stem 50A. The lower end of passage 48A communicates with valve chamber 20A and has a central projection 52A extending therein adjacent the passage opening to the valve chamber to provide a frusto-conical seat portion 54A facing the valve chamber. The upper end of passage 48A opens into an enlarged bearing chamber 56A which is internally threaded at its upper or 58A. The valve stem 50A is normally longitudinally fixed within passage 48A with its lower end section extending into valve chamber 20A. The lower valve stem end section includes an externally threaded portion 60A to provide a connection with gate member 40A via a stem connection means 62A, and an upwardly facing frusto-conical backseat portion 64A which is adjacent the threaded end section 60A. The stem backseat portion 64A is normally held in a position spaced from bonnet assembly seat portion 54A. The valve stem 50A further includes a reduced diameter portion 66A defining an upwardly facing stem shoulder 68A, and an externally threaded portion 70A located adjacent and above the reduced diameter portion 66A. The reduced diameter portion 66A and threaded portion 70A are longitudinally positioned within the enlarged bearing chamber 54A and a support plate 72A being located at the bottom of this chamber surrounding the valve stem 50A. Upper and lower roller bearings 74A and 76A, respectively, are positioned within the bearing chamber surrounding the valve stem 50A with the lower bearing 76A resting on support plate 72A. The roller bearings 74A and 76A are separated by an annular spacer 78A which has an inwardly extending flange 80A intermediate its end defining upper and lower support shoulders 82A and 84A, respectively. The upper support shoulder 82A supports a lock nut 86A which is threaded on the externally threaded portion 70A of valve stem 50A and a key 88A rotationally locks the valve stem 50A to spacer flange 80A. A packing retainer 90A and cover plate 92A are threadably received in the upper end of the bearing chamber 56A, the packing retainer being installed first and, after its adjustment, the cover plate being installed. Lubrication of roller bearings 74A and 76A ma be of permanent or sealed type or lubrication may be effected by introducing lubricant through a fitting 94A. The upper end section of valve stem 50A extending above the bonnet assembly 14A is tapered and terminates in the reduced diameter threaded section 96A. A handwheel 98A fits over the tapered portion of stem 50A and is secured thereto by nut 100A.

Stem passage 48A further defines an annular packing chamber within bonnet assembly 14A and a packing assembly 102A is disposed within this chamber to form a fluid-tight seal between the valve stem 50A and bonnet assembly 14A. Packing assembly 102A may include any of a number of commercially available packing materials which may be introduced into the packing chamber via a packing fitting 104A extending radially from the packing chamber to the outside of the bonnet assembly 14A.

The stem connection means 62A provides a structure to connect the lower end of the valve stem 50A to an upwardly extending integral extension 158 of gate assembly 142. The gate assembly extension 158 is externally threaded as indicated at 160 and has a longitudinal bore 162 in which the threaded valve stem end section 60A is received. The gate member extension further includes a pair of aligned slots 164 formed in its upper end. The stem connection structure further includes a stem nut 114A which is threadably received on the valve stem end section 60A. The stem nut 114A includes a pair of ears 116A which depend downwardly from the stem nut 114A and are received in the corresponding slots 164. The engagement between ears 116A and the sides of slots 164 prevents stem nut 114 from rotating relative to gate assembly 142 so that the rotary movement of valve stem 50A is translated to vertical movement of gate assembly 142. A gate nut 118A of cylindrical cup shape is threadably received onto the gate assembly extension 158 surrounding valve stem 50A and enclosing the stem nut 114A. The top portion of the gate nut 118A has an opening 120A of larger diameter than the diameter of valve stem 50A, but smaller in diameter than the diameter of stem nut 114A. This particular size relationship between the gate nut opening 120A, the valve stem 50A and the stem nut 114A allows gate nut 118A to loosely fit about valve stem 50A when gate nut 118A is attached to gate assembly extension 158 while simultaneously holding stem nut 114A in position on the stem.

The heat responsive backseat of the present invention is the same for both a slab and an expanding type of gate valve. As is illustrated in FIG. 6, the gate valve 140 is normally a non-rising stem expanding gate valve wherein the main seal between the valve chamber 20A and the external environment where the valve stem 50A penetrates the bonnet assembly is conventionally provided by the packing assembly 102A as discussed above. However, should there be a fire in the vicinity of the gate valve 140 there exists the possibility that the packing assembly 102A will be destroyed. Therefore, it is desirable to provide a gate valve with a secondary sealing system which will allow the normally non-rising valve stem to rise slightly to provide a metal-to-metal backseat seal between the valve stem and the bonnet assembly in case the gate valve is ever subjected to the extreme heat of a fire condition. The heat responsive backseat of the present invention is provided in gate valve 140 between the valve stem backseat portion 64A and the bonnet seat portion 54A. The valve stem 50A is longitudinally fixed in place by use of a fusible material 126A which is fashioned in the shape of a ring and is positioned within the annular space between the lower support shoulder 84A of annular spacer 78A and the top of the lower roller bearing 76A surrounding the reduced diameter portion 66A of valve stem 50A. A pair of washers 128A and 130A are positioned above and below, respectively, the fusible ring 126A such that the upwardly facing valve stem shoulder 68A contacts the lower washer 130A. The longitudinal position of the valve stem 50A is fixed by threading lock nut 86A tightly onto the valve stem externally threaded portion 70A which in turn raises the valve stem 50A until the stem shoulder 68a solidly contacts the washer 130A and fusible material 126A. When the fusible ring 126A melts it is drained and/or otherwise expelled from its position supporting valve stem 50A to the exterior of annular spacer 78A through drain holes 132A to assure that the fusible material does not become trapped and continue to maintain its support of stem shoulder 68A and valve stem 50A. This assures that valve stem 50A is free to move axially to provide the metal-to-metal backseat seal between the stem backseat portion 64A and the bonnet seat portion 54A. The pressure within the valve chamber 20A acts on the stem to urge it upwardly or outwardly until such a backseat seal is obtained.

However, due to the nature of expanding type gate valves, it is important that the valve stem 50A be able to rise sufficiently to provide the backseat seal independently of the gate assembly 142. Therefore, fusible gate ring 134A has been provided within gate nut 118A so that upon melting of ring 134A the valve stem 50A will move axially upward independent of the gate nut 118A and gate member 142. The fusible gate ring 134A is positioned between the upper surface of stem nut 114A and the lower inside surface of gate nut 118A surrounding the lower valve stem portion 60A. The ring 134A has a larger diameter than the diameter of opening 120A in gate nut 118A such that the ring 134A supports gate nut 118A and gate assembly 142 on stem nut 114A. It may be necessary to provide a bearing washer 136A between ring 134A and gate nut 118A to better transmit the load from gate assembly 142 across the entire surface of fusible gate ring 134A. Referring to FIG. 6, upon the occurrence of a fire condition which radiates extreme heat, the fusible stem and gate rings 126A and 134A, respectively, will melt vacating their respective positions supporting the valve stem 50A. Thus, the valve stem will move axially upward under fluid pressure from within the valve chamber to provide the metal-to-metal backseat between valve stem backseat portion 64A and bonnet seat portion 54A independently of the roller bearings 74A and 76A and the gate assembly 142.

It will be evident from the foregoing that the present invention provides a unique heat responsive backseat for gate valves. The novel design of the invention allows the valve stem to backseat seal with the bonnet assembly independently without axial movement of the rollers bearings so that it is impossible for the roller bearings to become cocked or wedged within the bearing chamber and against the valve stem to inhibit later rotation of the valve stem. Furthermore, the valve stem moves axially independently of the gate member so that gate drag does not effect the upward movement of the valve stem to provide the metal-to-metal backseat seal with the bonnet assembly.

The foregoing description of the invention has been presented for the purpose of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. For example, the non-rising stem type slab gate valve was illustrated with a gate stop to limit the upward movement of the gate member relative to the bonnet assembly. However, such a gate stop could be eliminated so that valve stem would move axially upward relative to the bonnet assembly upon melting of only the fusible stem ring. In such a valve, the fusible gate ring would be unnecessary to provide the backseat seal between the valve stem and bonnet assembly, unless, gate drag was seen to represent a significant porblem due to the particular use contemplated. It is intended that the scope of the invention be defined by the claims appended hereto.

What is claimed is:
1. A gate value comprising:

a valve body having an open ended valve chamber and inlet and outlet fluid passages communicating with the valve chamber, a valve seat positioned about each said inlet and outlet fluid passages adjacent the valve chamber;

a bonnet assembly forming a closure for the valve chamber and having a central bore therein communicating with the valve chamber, the central bore having a seat portion facing in a direction toward the valve chamber and an enlarged diameter bore portion axially spaced from the seat portion in a direction away from the valve body;

an axially rotatable non-rising valve stem carried within the central bore of the bonnet assembly and having a threaded end section extending into the valve chamber, a backseat portion facing toward the bonnet assembly and positioned in a normally spaced relationship to the seat portion of the bonnet assembly, and a valve stem shoulder positioned within the enlarged diameter bore portion facing in an upwardly direction away from the valve chamber;

packing means positionable within the central bore of the bonnet assembly between the seat portion and enlarged diameter bore portion surrounding the valve stem for sealing between the valve stem and bonnet assembly;

a gate member disposed in the valve chamber and movable between open and closed positions relative to the fluid passages to control fluid flow through the valve, the gate member having an externally threaded extension with a longitudinal bore therein for receiving the threaded end section of the valve stem;

a stem connection means positioned in the valve chamber for providing a connection between the threaded end section of the valve stem and the gate member extension, the stem connection means translating rotational movement of the valve stem into longitudinal movement of the gate member;

roller bearing means including an upper roller bearing and a lower roller bearing separated by a spacer positioned in an axially fixed relationship within the enlarged bore portion of the central bonnet assembly bore for supporting and providing for axial rotation of the valve stem within the gate valve, the roller bearing means further including a key positioned between the valve stem and spacer for rotationally fixing the valve stem to the spacer such that upon rotation of the valve stem, the spacer rotates between the upper and lower bearings; and a fusible stem spacing element of a preselected temperature degradable material positioned between the upper roller bearing and lower roller bearing, the spacing element acting as a spacer separating the upwardly facing valve stem shoulder and a portion of the axially fixed roller bearing means for normally maintaining the valve stem in a fixed axial position relative to the bonnet assembly and normally maintaining the upwardly facing valve stem backseat portion in a spaced relationship to the downwardly facing bonnet seat portion, the fusible stem spacing element being adapted to relax its spacing function upon reaching the preselected temperature condition so that the valve stem is allowed freedom to move axially upward to a limited extent relative to the upper and lower roller bearings and the bonnet assembly allowing the valve stem backseat portion to sealingly contact the bonnet seat portion to provide a secondary metal-to-metal seal between the valve stem and bonnet assembly in a fire situation, the upper roller bearing and lower roller bearing remaining in a fixed axial position relative to the bonnet assembly before, during and after shifting of the valve stem so that rotation of the valve stem after the fire situation has been extinguished will not be affected such that the gate member may continue to be easily opened or closed with respect to the inlet and outlet fluid passages.

2. A gate valve as recited in claim 1, in which the stem connection means comprises:

a pair of opposed slots on the upper end of the gate extension;

a stem nut threaded onto the end section of the valve stem and having a pair of ears fitting within the opposed slots whereby rotation of the valve stem effects movement of the gate member between open and closed positions of the fluid passages;

an inverted cup-shaped gate nut threaded onto the externally threaded gate member extension forming a chamber which encloses the stem nut, the gate nut having an opening in its closed end receiving the valve stem, the chamber having a larger inside axial dimension than the axial dimension of the stem nut; and a fusible gate spacing element of a preselected temperature degradable material positioned within the chamber between the stem nut and the closed end of the gate nut for normally maintaining the stem nut in a fixed relative axial position with respect to the gate nut and gate member, the fusible gate spacing element being adapted to relax its spacing function upon reaching the preselected temperature condition so that the stem nut and valve stem are free to move to a limited axial extent relative to the gate nut and gate member so that the valve stem backseat portion sealingly contacts the bonnet seat portion to provide a metal-to-metal seal between the valve stem and bonnet assembly without having to overcome gate drag caused by the force of fluid flow in the fluid passages interacting on the gate member.

3. A gate valve as recited in claim 2, wherein the stem connection means further comprises:

a shoulder stop on the exterior circumference of the gate nut which contacts the bonnet assembly when the gate member is in its open position with respect to the fluid passages to limit the upward axial movement of the gate nut and gate member relative to the bonnet assembly whereby upon melting of the fusible stem and gate elements the stem nut and valve stem are free to move to a limited axial extent relative to the gate nut and gate member to allow the valve stem backseat to sealingly contact the bonnet seat portion to provide a metal-to-metal seal between the valve stem and bonnet assembly.

4. A gate valve as recited in claim 1 wherein the fusible spacing element is a eutectic metal alloy having a melting point sufficiently above the normal temperatures to which it is to be exposed in normal valve operations without having excessive deformation from compressive stress at such temperatures and having a sufficiently low melting point to melt promptly when the valve is exposed to a fire condition.

5. A gate valve as recited in claim 1, wherein the bonnet seat portion and the backseat portion of the valve stem are complementarily frusto-conical in shape.

6. An improved heat responsive backseat for gate valves of the type having a valve body in which is formed an open-ended valve chamber and inlet and outlet fluid passages communicating with the valve chamber, a bonnet assembly forming a closure for the valve chamber and including a central bore with a seat portion facing in a direction toward the valve chamber and an enlarged diameter outer bore portion axially spaced from the seat portion in a direction away from the valve body, an axially rotatable normally non-rising valve stem carried by the bonnet assembly and including a threaded end section extending into the valve chamber having a backseat position positioned adjacent thereto facing the bonnet assembly, the backseat portion being positioned in a normally spaced relationship to the bonnet seat portion, a gate member disposed in the valve chamber and movable between open and closed positions relative to the fluid passages to control fluid flow through the valve, a stem connection means positioned in the valve chamber for providing a connection betweeen the valve stem and gate member, and roller bearings means positioned within the enlarged bonnet bore portion providing for axial rotation of the valve stem within the gate valve, wherein the improvement comprises:
  a reduced diameter portion on the valve stem defining an upwardly facing stem shoulder spaced from the valve stem backseat portion in a direction away from the valve body;
  the roller bearing means including an upper roller bearing and a lower roller bearing separated by a spacer, positioned in an axially fixed relationship within the enlarged bore portion of the bonnet assembly the spacer bearing keyed to the valve stem such that upon rotation of the valve stem the spacer rotates between the upper and lower roller bearings;
  a fusible stem spacing element of a preselected temperature degradable material surrounding the valve stem and positioned between the upper roller bearing and lower roller bearing, the spacing element acting as a spacer separating the upwardly facing valve stem shoulder and a portion of the axially fixed roller bearing means for normally maintaining the valve stem in a fixed axial position relative to the roller bearing means and bonnet assembly and normally maintaining the upwardly facing valve stem backseat portion in a spaced relationship to the downwardly facing bonnet seat portion; and
  the fusible stem spacing element being adopted to relax its spacing function upon reaching the preselected temperature condition such as in a fire situation so that the valve stem is allowed freedom to move axially upward to a limited extent with respect to the upper and lower roller bearings and the bonnet assembly, allowing the valve stem backseat portion to sealingly contact the bonnet seat portion to provide a secondary metal-to-metal seal between the valve stem and bonnet assembly in a fire situation without axial movement of the upper and lower roller bearings.

7. An improved heat responsive backseat for gate valves as recited in claim 6, in which the stem connection means comprises:
  a pair of opposed slots on the upper end of the gate member;
  a stem nut threaded onto the end section of the valve stem and having a pair of ears fitting within the opposed slots whereby rotation of the valve stem effects movement of the gate member between open and closed positions;
  an inverted cup-shaped gate nut threaded onto the upper end of the gate member forming a chamber which encloses the stem nut, the gate nut having an opening in its closed end receiving the valve stem, the chamber having a larger inside axial dimension than the axial dimension of the stem nut; and
  a fusible gate spacing element of a preselected temperature degradable material positioned within the chamber between the stem nut and the closed end of the gate nut for normally maintaining the stem nut in a fixed relative axial position with respect to the gate nut and gate member, the fusible gate spacing elemenet being adapted to relax its spacing function upon reaching the preselected temperature condition so that the stem nut and valve stem are free to move to a limited axial extent relative to the gate nut and gate member such that the valve stem backseat portion sealingly contacts the bonnet seat portion to provide a metal-to-metal seal between the valve stem and bonnet assembly without axial movement of the gate member.

8. An improved heat responsive backseat for gate valves as recited in claim 7, wherein the fusible spacing elements are eutectic metal alloys having a melting point sufficiently above the normal temperatures to which they are to be exposed in normal valve operation without having excessive deformation from compressive stress at such temperatures and having a sufficiently low melting point to melt promptly when the valve is exposed to a fire condition.

9. An improved heat responsive backseat for gate valves as recited in claim 8, wherein the bonnet seat portion and the backseat portion of the valve stem are complementarily frusto-conical in shape.

10. A valve body having an open-ended valve chamber and inlet and outlet fluid passages communicating with the valve chamber;
  a gate member disposed in the valve chamber and movable between open and closed positions relative to the fluid passages to control fluid flow through the valve;
  a bonnet assembly forming a closure for the valve chamber and having a central bore with a seat portion in a direction toward the valve chamber;
  an axially rotatable normally non-rising valve stem extending through the central bonnet bore and threadedly engaging the gate member, the valve stem having an upwardly facing backseat portion positionable within the valve chamber being normally in a spaced relationship to the bonnet seat portion, and a reduced diameter portion defining an upwardly facing stem shoulder spaced from the backseat portion thereof in a direction away from the valve body;
  packing means positioned in the central bonnet bore for sealing between the valve stem and bonnet assembly and spaced from the bonnet seat portion in a direction away from the valve body;
  roller bearing means surrounding the valve stem and positioned further away from the valve body then the packing means and including an upper roller bearing and a lower roller bearing separated by an annular spacer positioned in an axially fixed relationship with respect to the valve stem and bonnet assembly for supporting and providing for axial rotation of the valve stem within the gate valve, the spacer being keyed to the valve stem such that upon rotation of the valve stem the spacer rotates between the upper and lower roller bearings;

a fusible stem spacing element of a preselected temperature degradable material surrounding the valve stem and positioned between the upper roller bearing and lower roller bearing, the spacing element acting as a spacer separating the upwardly facing valve stem shoulder and a portion of the axially fixed bearing means for normally maintaining the valve stem in a fixed axial position relative to the roller bearing means and bonnet assembly, and normally maintaining the valve stem backseat portion in a spaced relationship to the bonnet seat portion; and the fusible stem spacing element being adapted to relax its spacing function upon reaching the preselected temperature condition so that the valve stem is free to move axially relative to the upper and lower roller bearings and the bonnet assembly such that the valve stem backseat portion sealingly contacts the bonnet seat portion to provide a secondary metal-to-metal backseat seal between the valve stem and bonnet assembly without axial movement of the upper and lower roller bearings.

11. A gate valve as recited in claim 10, further comprising:

a stem connection means positioned within the valve chamber for providing a connection between the threaded-end section of the valve stem and the gate member including a pair of opposed slots on the upper end of the gate member, a stem nut threaded onto the end section of the valve stem and having a pair of ears fitting within the opposed slots, and an inverted cup-shaped gate nut threaded onto the upper end of the gate member forming a chamber which enclosed the stem nut, the gate nut having an opening in its closed end which receives the valve stem therethrough, the chamber having a larger inside axial dimension than the axial dimension of the stem nut, the stem connection means translating rotational movement of the valve stem into longitudinal movement of the gate member;

a fusible gate spacing element of a preselected temperature degradable material positioned within the chamber between the stem nut and the closed end of the gate nut for normally maintaining the stem nut in a fixed relative axial position with respect to the gate nut and gate member; and the fusible gate spacing element being adapted to relax its spacing function upon reaching the preselected temperature condition so that the stem nut and valve stem are free to move to a limited axial extent relative to the gate nut and gate member such that the valve stem backseat portion is allowed to sealingly contact the bonnet seat portion to provide a secondary metal-to-metal seal between the valve steam and bonnet assembly without having to overcome gate drag caused by the force of fluid flow in the fluid passages interacting on the gate member.

12. A gate valve as recited in claim 11, wherein the stem connection means further comprises:

a shoulder stop on the exterior circumference of the gate nut which contacts the bonnet assembly when the gate member is in its open position with respect to the fluid passages to limit the upward axial movement of the gate nut and gate member relative to the bonnet assembly whereby upon melting of the fusible stem and gate elements the stem nut and valve stem are free to move to a limited axial extent relative to the gate nut and gate member to allow the valve stem backseat to sealingly contact the bonnet seat portion to provide a metal-to-metal seal between the valve stem and bonnet assembly.

13. A gate valve as recited in claim 12, wherein the fusible spacing elements are eutectic metal alloys having a melting point sufficiently above the normal temperatures to which it is to be exposed in normal valve operations without having excessive deformation from compressive stress at such temperature and having a sufficiently low melting point to melt promptly when the valve is exposed to a fire condition.

14. A gate valve as recited in claim 12, wherein the bonnet seat portion and the backseat portion of the valve stem are complementarily frusto-conical in shape.

15. A gate valve comprising:

a valve body having an open ended valve chamber and inlet and outlet fluid passages communicating with the valve chamber, a valve seat positioned about each of the inlet and outlet fluid passages adjacent the valve chamber;

a bonnet assembly forming a closure for the valve chamber and having a central bore therein communicating with the valve chamber, the central bore having a seat portion facing in a direction toward the valve chamber and an enlarged diameter bore portion axially spaced from the seat portion in a direction away from said valve body;

an axially rotatably non-rising valve stem carried within the central bore of said bonnet assembly and having a threaded end section extending into the valve chamber, a backseat portion facing toward said bonnet assembly and positioned in a normally spaced relationship to the seat portion of said bonnet assembly, and a valve stem shoulder positioned within the enlarged diameter bore portion facing in an upwardly direction away from the valve chamber;

packing means positionable within the central bore of the bonnet asembly between the seat portion and enlarged diameter bore portion surrounding said valve stem for providing the primary seal between said valve stem and bonnet assembly;

bearing means axially positioning said valve stem in said bonnet assembly, said bearing means being secured within the enlarged diameter bore portion of said bonnet assembly;

a fusible stem spacing element of a preselected temperature degradable material positioned adjacent said bearing means for normally maintaining said valve stem in a fixed axial position relative to said bonnet assembly;

a gate member disposed in the valve chamber and movable between open and closed positions relative to the fluid passages to control fluid flow through the valve, said gate member having an externally threaded extension with a longitudinal bore therein for receiving the threaded end section of said valve stem;

a stem connection means positioned in the valve chamber for providing a connection between the threaded end section of said valve stem and the gate member extension, said stem connection means translating rotational movement of said valve stem into longitudinal movement of said gate member;

a fusible gate spacing element of a preselected temperature degradable material positioned within said stem connection means for normally maintaining said stem connection means in a fixed axial relationship relative to said gate member; and said fusible stem spacing element and said fusible gate spacing element being adapted to relax their spacing functions upon reaching the preselected temperature condition to allow said valve stem freedom to move axially upward to a limited extent relative to said bonnet assembly and said gate member so that the valve stem backseat portion sealingly contacts the bonnet seat portion without corresponding longitudinal movement of said gate member to provide a secondary metal-to-metal seal between said valve stem and said bonnet assembly in a fire situation which may destroy said primary packing means.

16. A gate valve as recited in claim 15, in which said stem connection means comprises:

a pair of opposed slots on the upper end of the gate extension;

a stem nut threaded onto the end section of said valve stem and having a pair of ears fitting within said opposed slots whereby rotation of said valve stem effects longitudinal movement of said gate member between open and closed positions of the fluid passages;

an inverted cup-shaped gate nut threaded onto the externally threaded gate member extension forming a chamber which encloses said stem nut, said gate nut having an opening in its closed end loosely receiving said valve stem therethrough; and said fusible gate spacing element being positioned within the chamber between said stem nut and the closed end of said gate nut for normally maintaining said stem nut in a fixed relative axial position with respect to said gate nut and said gate member, said fusible gate spacing element being adapted to relax its spacing function upon reaching the preselected temperature condition so that said stem nut and said valve stem are free to move a limited axial extent relative to said gate nut and gate member so that the valve stem backseat portion sealingly contacts the bonnet seat portion to provide a metal-to-metal seal between said valve stem and bonnet assembly, said valve stem being permitted to move axially upward without having to overcome gate drag caused by the force of flulid flow in the fluid passages acting on said gate member.

17. A gate valve as recited in claim 15 wherein said fusible spacing elements are annular rings made of a eutectic metal alloy having a melting point sufficiently above the normal temperatures to which it is to be exposed in normal valve operations without having excessive deformation from compressive stress at such temperatures and having a sufficiently low melting point to melt promptly when the valve is exposed to a fire condition.

18. A gate valve as recited in claim 15, wherein the bonnet seat portion and the backseat portion of said valve stem are complementarily frusto-conical in shape.

19. An improved heat responsive backseat for gate valves of the type having a valve body in which is formed an open ended valve chamber and inlet and outlet fluid passages communicating with the valve chamber, a bonnet assembly forming a closure for the valve chamber and including a central bore with a seat portion facing in a direction toward the valve chamber and an enlarged diameter outer bore portion axially spaced from the seat portion in a direction away from the valve body, an axially rotatable normally non-rising valve stem carried by the bonnet assembly and including a threaded end section extending into the valve chamber and a backseat portion formed thereon adjacent the end section positiond within the valve chamber facing the bonnet assembly and positioned in a normally spaced relationship to the bonnet seat portion, a gate member disposed in the valve chamber and movable between open and closed positions relative to the fluid passages to control fluid flow through the valve, a stem connection means positioned in the valve chamber for providing a connection between the valve stem and gate member, bearing means positioned within the enlarged diameter outer bore portion for providing axial rotation of the valve stem within the gate valve, and a fusible stem spacing element of a preselected temperature degradable material positioned adjacent the bearing means for normally maintaining the valve stem in a fixed axial position relative to the bonnet assembly, the fusible stem spacing element being adapted to relax its spacing function upon reaching the preselected temperature condition to allow the valve stem to move upwardly to a limited axial extent relative to the bonnet assembly such that the valve stem backseat portion sealingly contacts the bonnet seat portion, wherein the improvement comprises;

a fusible gate spacing element of a preselected temperature degradable material positioned with the stem connection means for normally maintaining the stem connection means in a fixed axial relationship relative to said gate member, said fusible gate spacing element being adapted to relax its spacing function upon reaching the preselected temperature condition to allow the valve stem freedom to move axially upward to a limited extent relative to the gate member so that the valve stem backseat portion sealingly contacts the bonnet seat portion without longitudinal movement of the gate member.

20. An improved heat responsive backseat for gate valves as recited in claim 19, in which the stem connection means further comprises:

a pair of opposed slots on the upper end of the gate member;

a stem nut threaded onto the end section of the valve stem and having a pair of ears fitting within said opposed slots whereby rotation of the valve stem effects movement of the gate member between open and closed positions;

an inverted cup-shaped gate nut threaded onto the upper end of the gate member forming a chamber which encloses said stem nut, said gate nut having an opening in its closed end loosely receiving the valve stem, the chamber having a larger inside axial dimension than the axial dimension of said stem nut; and said fusible gate spacing element being positioned within the chamber between said stem nut and the closed end of said gate nut for normally maintaining said stem nut in a fixed relative axial position with respect to said gate nut and gate member, said fusible gate spacing element being adapted to relax its spacing function upon reaching the preselected temperature condition so that said stem nut and valve stem are free to move a limited axial extent relative to said gate nut and gate member so that the valve stem backseat portion sealingly contacts the bonnet seat portion to provide a metal-to-metal seal between the valve stem and bonnet assembly, said valve stem being permitted to move axially upward without corresponding longitudinal movement of said gate member.

* * * * *